(12) United States Patent
Roos (10) Patent No.: US 10,663,319 B2
(45) Date of Patent: May 26, 2020

(54) SENSOR DEVICE FOR DETERMINING THE POSITION OF THE ROTOR OF AN ELECTRICAL MACHINE AND CONTROL DEVICE FOR AN ELECTRIC MOTOR

(71) Applicants: NM Numerical Modelling GmbH, Zug (CH); maglab AG, Basel (CH)

(72) Inventor: Markus Roos, Baar (CH)

(73) Assignees: NM Numerial Modelling GmbH (CH); maglab AG (CH)

( * ) Notice: Subject to any disclaimer, the term of this patent is extended or adjusted under 35 U.S.C. 154(b) by 83 days.

(21) Appl. No.: 15/694,800

(22) Filed: Sep. 3, 2017

(65) Prior Publication Data

US 2018/0080797 A1 Mar. 22, 2018

(30) Foreign Application Priority Data

Apr. 19, 2017 (EP) .................................... 17167135
Jul. 7, 2017 (EP) .................................... 17180252

(51) Int. Cl.
*G01D 5/14* (2006.01)
*G01D 5/244* (2006.01)
(Continued)

(52) U.S. Cl.
CPC ............... *G01D 5/14* (2013.01); *G01D 5/145* (2013.01); *G01D 5/24452* (2013.01);
(Continued)

(58) Field of Classification Search
CPC ........ G01D 5/14; G01D 5/145; H02K 11/215; H02P 6/16
(Continued)

(56) References Cited

U.S. PATENT DOCUMENTS 6,297,574 B1 * 10/2001 Schob ................. F16C 32/0453
310/168
6,791,219 B1 * 9/2004 Eric ....................... H02K 29/08
310/68 B
(Continued)

FOREIGN PATENT DOCUMENTS

DE 10034733 A1 2/2001
WO 02065247 A2 8/2002
(Continued)

OTHER PUBLICATIONS

European Patent Office, European Patent Search Report for EP-17-18-0252 dated Feb. 8, 2018.
(Continued)

*Primary Examiner* — Kawing Chan
(74) *Attorney, Agent, or Firm* — CanannLaw, P.C.; David B. Ritchie (57) ABSTRACT

A sensor device for determining a position $\phi_1$ of a rotor of an electrical machine, for example an electric motor or electric generator. The sensor device comprises a number r of sensors, which detect the magnetic field generated by the rotor and/or a permanent magnet rotating with the rotor, and an electronic circuit which is configured
to detect and digitalize the sensor signals $a_1$ to $a_r$, and to form a signal vector $\vec{a}=(a_1, \ldots, a_r)$,
to form a measurement vector $\vec{q}$ according to a predetermined linear function g to $\vec{q}=g(\vec{a})$,
to calculate a vector $\vec{p}=M_{rot1} \cdot \vec{q}$, wherein $\vec{p}$ is a 2-component vector with the components $p_1$ and $p_2$ and $M_{rot1}$ is a 2×n matrix, and
to determine the position $\phi_1$ of the rotor to $\phi_1$=a tan $2(p_2, p_1)$.
(Continued)

The invention further concerns a control device for an electric motor with such a sensor device.

16 Claims, 2 Drawing Sheets

(51) Int. Cl.
  *H02K 11/215* (2016.01)
  *H02P 6/16* (2016.01)
(52) U.S. Cl.
  CPC ....... *G01D 5/24476* (2013.01); *H02K 11/215* (2016.01); *H02P 6/16* (2013.01)
(58) Field of Classification Search
  USPC .................................................... 318/400.38
  See application file for complete search history.

(56) References Cited

U.S. PATENT DOCUMENTS

| | | | |
|---|---|---|---|
| 7,620,514 B2 | 11/2009 | Steinlechner | |
| 7,986,138 B2 * | 7/2011 | Schmid | B60L 13/06 324/207.11 |
| 8,248,039 B2 * | 8/2012 | Cao | F03D 7/0272 290/44 |
| 9,151,645 B2 * | 10/2015 | Hagenauer | G01D 5/2073 |
| 2008/0134727 A1 * | 6/2008 | May | G01D 5/145 68/12.02 |
| 2011/0067479 A1 | 3/2011 | Davis et al. | |
| 2011/0238367 A1 * | 9/2011 | Matsumoto | G01D 5/145 702/151 |
| 2014/0175908 A1 * | 6/2014 | Bats | H02P 9/42 307/151 |
| 2015/0048242 A1 | 2/2015 | Remillard et al. | |
| 2015/0185293 A1 * | 7/2015 | Milano | G01R 31/2884 324/251 |

FOREIGN PATENT DOCUMENTS

| | | |
|---|---|---|
| WO | 2005124286 A1 | 12/2005 |
| WO | 2013/057614 A2 | 4/2013 |

OTHER PUBLICATIONS

European Patent Office, European Patent Search Report for EP-17-16-7135 dated Oct. 24, 2017.

* cited by examiner

SENSOR DEVICE FOR DETERMINING THE POSITION OF THE ROTOR OF AN ELECTRICAL MACHINE AND CONTROL DEVICE FOR AN ELECTRIC MOTOR

PRIORITY CLAIM

Applicant hereby claims foreign priority under 35 U.S.C § 119 from Swiss Patent Application No. 01207/16 filed on Sep. 16, 2016 and from European Patent Application No. 17167135.7 filed on Apr. 19, 2017 and from European Patent Application No. 17180252.3 filed on Jul. 7, 2017, the disclosures of all of which are herein incorporated by reference.

CROSS REFERENCE TO RELATED APPLICATION

The present application is related to U.S. patent application Ser. No. 15/694,798 filed Sep. 3, 2017 and commonly owned herewith entitled "Method for determining the position of the position indicator of a position measuring system", which corresponds to the above mentioned European Patent Application No. 17167135.7. The disclosure of this related U.S. patent application is herein incorporated by reference.

FIELD OF THE INVENTION

The invention concerns a sensor device for determining the position of the rotor of an electrical machine, which comprises a rotor rotatable about an axis and a stator, and a control device for such an electric machine. The electric machine can be, for example, an electric motor or an electric generator.

BACKGROUND OF THE INVENTION

Often, magnetic systems are used to determine the position of the rotor of such an electrical machine. The magnetic system comprises a permanent magnet mounted on the rotor axis which acts as a rotary angle indicator and at least two sensors which detect the magnetic field generated by the rotary angle indicator. The angular position of the rotary angle indicator is determined from the sensor signals.

Both dipolar magnets and higher multipole magnets are used as permanent magnets. The absolute position of the rotation angle indicator can be determined with a dipole magnet, which is no longer the case with a higher multipole magnet. The loss of the information about the absolute position results in a gain in resolution with higher multipolar magnets.

In an electric motor as well as in a generator, there are inherently scatter and interference field sources which impair the measuring accuracy. In particular, in a structure in which the sensors are arranged in the region of the magnetic field generated by the stator, the stator is a strong source of interference fields due to its proximity to the rotary angle indicator. In many types of motors, the stator coils are operated with rotary current, whereby the magnetic field thereof also rotates about the motor axis.

In order to increase performance, electromotors are often operated close to or in saturation of the magnetic material of the stator and/or the rotor. This leads to field distortions and generates sensor signals with harmonic waves, i.e., the signals not only reflect the periodicity of the pole pitch of the rotor and stator as a function of the angle of rotation, but also contain superpositions of multiples of the corresponding fundamental waves. These field distortions significantly reduce the accuracy or even make the determination of the position impossible.

Electromotors are widely used in industrial, household and automotive electronics markets. Electromotors include all types, such as flat motors, synchronous motors, asynchronous motors, alternating current motors and stepping motors.

One example is the use as a drive motor of hybrid or purely electric vehicles. In order to guarantee a high efficiency and good driving comfort, the rotor position must be measured very precisely. Often, inductive or optical sensor systems are used for position detection, which however occupy a large installation space and are expensive.

SUMMARY OF THE INVENTION

The invention is based on the object of developing a cost-effective sensor device which makes it possible to determine the position of the rotor of an electrical machine with high accuracy, even if interference fields and/or field distortions are present in the region of the sensors.

The invention relates, on the one hand, to a sensor device for determining a position of the rotor of an electrical machine which comprises a rotor rotatable about an axis and a stator. The sensor device comprises a number, r, of magnetic sensors which supply sensor signals $a_1$ to $a_r$, and is configured to detect and digitalize the sensor signals $a_1$ to $a_r$ and to form a signal vector $\vec{a}=(a_1, \ldots, a_r)$, to form a measurement vector $\vec{q}$ according to a predetermined linear function g to $\vec{q}=g(\vec{a})$, wherein the measurement vector $\vec{q}$ comprises a number, n, of components, with $2 \leq n \leq r$, to calculate a vector $\vec{p}=M_{rot1} \cdot \vec{q}$, wherein $\vec{p}$ is a 2-component vector with the components $p_1$ and $p_2$ and $M_{rot1}$ is a 2×n matrix, and to determine a position $\phi_1$ of the rotor to $\phi_1=a\tan 2(p_2, p_1)$.

The function $g(\vec{a})$ is in particular one of the following functions:

$$g(\vec{a})=\vec{a}, \quad \quad 1)$$

$$g(\vec{a})=\vec{a}-\vec{a}_0, \quad \quad 2)$$

$$g(\vec{a})=P \cdot \vec{a}, \text{ or} \quad \quad 3)$$

$$g(\vec{a})=P \cdot (\vec{a}-\vec{a}_0), \quad \quad 4)$$

wherein $\vec{a}_0$ designates an offset vector and P a projection matrix, which projects undesired signal components out of the signals.

The sensor device may further be configured, to calculate a vector $\vec{x}=M_{rot2} \cdot \vec{q}$, wherein $\vec{x}$ is a 2-component vector with the components $x_1$ and $x_2$ and $M_{rot2}$ is a 2×n matrix, and to determine a further position $\phi_2$ of the rotor to $\phi_2=a\tan 2(x_2, x_1)$.

The position $\phi_1$ or the position $\phi_2$ is usually an absolute position.

The sensor device may additionally be configured, to determine a position w of the stator rotational field of the electrical machine, for which purpose it is configured to calculate a vector $\vec{y} = M_{stat} \cdot \vec{q}$, wherein $\vec{y}$ is a 2-component vector with the components $y_1$ and $y_2$ and $M_{stat}$ is a 2×n matrix, and to determine the position w of the stator rotational field to $\Psi = a\tan2(y_2, y_1)$.

The matrices $M_{rot1}$, $M_{rot2}$ and $M_{stat}$ map the orbit of the measurement vector, which is produced during a complete rotation of the rotor, on a circle or approximately a circle. These mappings are linear mappings. The position assigned to a specific measurement vector on the circle can then be calculated by means of the arc tangent function.

The application of the 2×n matrix $M_{rot1}$ on the measurement vector $\vec{q}$ causes all signal components of the sensors, which do not originate from a magnetic field that rotates with the rotor and has a first rotational symmetry, to be eliminated. The application of the 2×n matrix $M_{rot2}$ on the measurement vector $\vec{q}$ causes all signal components of the sensors, which do not originate from a magnetic field that rotates with the rotor and has a second rotational symmetry which is different from the first rotational symmetry to be eliminated. The application of the 2×n matrix $M_{stat}$ on the measurement vector $\vec{q}$ causes all the signal components of the sensors which were not generated by the stator to be eliminated provided that the rotational symmetry of the magnetic field produced by the stator is different from the first as well as the second rotational symmetry.

The matrices $M_{rot1}$, $M_{rot2}$ and $M_{stat}$ can be determined, for example, according to the method described in the above mentioned related U.S. patent application Ser. No. 15/694,798, which is referred to as COBROS method in the context of the present application.

According to a further development, the sensor device according to the invention can be supplemented with further electronic components in order to form a control device which allows precise control of an electric motor.

Such a control device comprises, in addition to the sensor device, a motor controller and a drive unit. The position $\phi_1$ of the rotor determined by the sensor device is fed to the motor controller. The motor controller generates control signals dependent on the first position $\phi_1$ for the drive unit and the drive unit generates the currents for the stator coils of the electric motor.

The control device can also be configured to additionally supply the position of the stator rotational field of the electric motor determined by the sensor device to the motor controller, in which case the motor controller generates control signals for the drive unit dependent on the positions $\phi_1$ and $\psi$.

The determination of the position of a position indicator is based on the finding that the sensor measurement values supplied by the sensors can be represented as a measurement vector, i.e., as a point in a vector space, the dimension of which corresponds to the number of sensors, and that the measurement vectors generated during the movement of the position indicator, e.g., a rotary angle indicator rotating about an axis of rotation or a linear position indicator displaceable along an axis, lie on a path called an orbit in this vector space. This orbit can—under ideal conditions—be projected onto a circle or a circular arc by means of a linear mapping, i.e., each position of the position indicator corresponds to a point on the orbit in the abstract space of the signal vectors which is unambiguously assigned to a point on the circle or arc. Non-ideal conditions, for example non-ideal properties of the position indicator, which can be particularly the case with magnets, or an insufficient number of sensors or the use of non-optimally selected calibration positions, cause deviations from the circular shape. The linear mapping can be represented as a matrix-vector operation and can be determined using standard methods of linear algebra. Each measurement vector is projected onto a 2-component vector, the tip of which approximates a circular arc, wherein the direction of the 2-component vector corresponds to the position of the position indicator. The linear mapping is determined in a calibration phase, which includes the detection of measurement vectors and the decomposition of a matrix formed by the measurement vectors into two or typically three matrices. The representation of the measured values provided by the sensors as a vector also makes it possible to reduce the influence of external fields, in particular magnetic external fields, by means of a further linear mapping.

Then, in normal operation, the position $\phi$ of the position indicator is calculated by the steps:

A) Detecting the sensor signals $\alpha_1$ to $\alpha_r$ of the sensors. The sensor signals $\alpha_1$ to $\alpha_r$ form an r-tuple $(\alpha_1 \ldots \alpha_r)$, which is interpreted as a signal vector $\vec{a} = (\alpha_1 \ldots \alpha_r)$ in an r-dimensional signal vector space.

B) Forming a measurement vector $\vec{q}$ according to a predetermined linear function to $\vec{q} = g(\vec{a})$.

C) Calculating a vector $\vec{p} = M \cdot \vec{q}$.

$\vec{p} = (p_1, p_2)$ is a 2-component vector with the components $p_1$ and $p_2$ and M is a 2×n matrix.

$\vec{p} = M \cdot \vec{q}$ can be written as $$\begin{pmatrix} p_1 \\ p_2 \end{pmatrix} = \begin{pmatrix} M_{11} & \ldots & M_{1n} \\ M_{21} & \ldots & M_{2n} \end{pmatrix} \cdot \begin{pmatrix} q_1 \\ \vdots \\ q_n \end{pmatrix}.$$

D) Determining the position $\phi$ from the components $p_1$ and $p_2$ of the vector $\vec{p}$ by means of a predetermined function $f(\vec{p})$ to $\phi = f(\vec{p}) = f(p_1, p_2)$.

The vector $\vec{p}$ contains the complete information about the position $\phi$ to be determined. For many applications, the relationship between the vector $\vec{p}$ and the position $\phi$ is given by the equations $p_1 = \cos(\phi)$ and $p_2 = \sin(\phi)$. The predetermined function $f(\vec{p}) = f(p_1, p_2)$ is a function, which is based on the equations $p_1 = \cos(\phi)$ and $p_2 = \sin(\phi)$. It is, in particular, a function, which determines the position $\phi$ on the basis of the equation $\phi = \text{arcustangens}(p_2/p_1)$ and the signs of the values $p_1$ and $p_2$. The function $f(\vec{p})$ is for example the function $f(\vec{p}) = a\tan2(p_2, p_1)$, wherein $a\tan2(p_2, p_1)$ is a function known from many programming languages which provides the correct angle in the range of 0 to $2\pi$.

The invention is explained in more detail below with reference to exemplary embodiments and with reference to the drawings. The invention is explained with the aid of electric motors. However, the following explanations apply not only to electric motors, but also to all electrical machines which comprise a rotor and a stator which can be rotated about an axis, for example also electric generators. In the following, the magnetic sensors are usually briefly referred to as sensors.

BRIEF DESCRIPTION OF THE DRAWING FIGURES

The accompanying drawings, which are incorporated into and constitute a part of this specification, illustrate one or more embodiments of the present invention and, together with the detailed description, serve to explain the principles and implementations of the invention. The figures are not to scale. In the drawings.

DETAILED DESCRIPTION OF THE INVENTION

Figure 1:
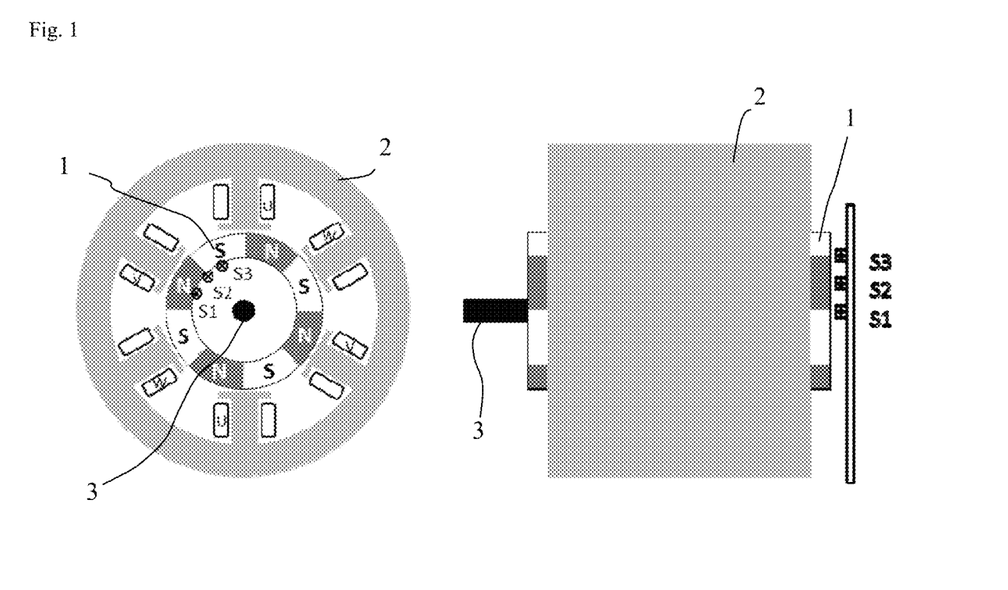
FIGS. 1 and 2 show electric motors equipped with a sensor device according to the invention, FIG. 3 schematically shows an electric motor and a first control device, and FIG. 4 schematically shows an electric motor and a second control device.
Figure 2:
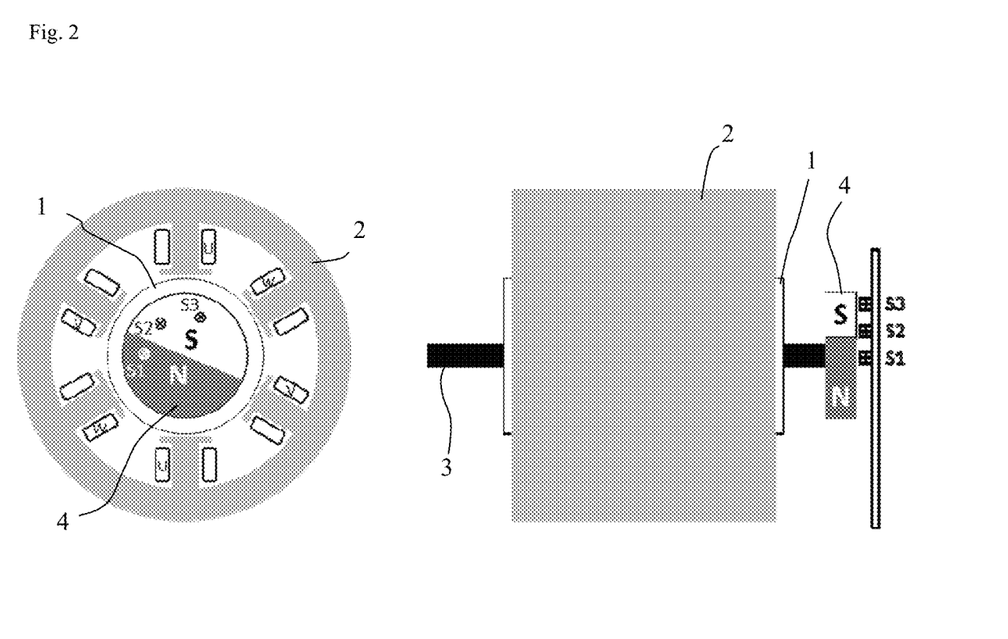

FIGS. 1 and 2 show examples of electric motors equipped with a sensor device according to the invention. The electric motor comprises a rotor 1 rotatable about an axis 3 and a stator 2. The rotor 1 is mounted on a shaft which rotates about the axis 3. The sensor device comprises a predetermined number r of magnetic sensors, for example Hall elements or magnetoresistive sensors, e.g., AMR (Anisotropic MagnetoResistive), GMR (Giant MagnetoResistive) and TMR (Tunnel MagnetoResisitive) sensors. The number r of the sensors depends on the tasks which the sensor device has to fulfill. For the sake of clarity, only three sensors S1, S2 and S3 are shown, although the number r of the sensors can also be two or more than three.

FIGS. 1 and 2 show—on the left in cross-section and on the right in plan view—the basic principle of a synchronous motor or an asynchronous motor. In the synchronous motor, the rotor 1 is a permanent magnet, in the asynchronous motor, the rotor 1 is a passive rotor, which is either short-circuited permanently or in a case-by-case manner, e.g., a cage runner. The two electric motors are supplied with a rotary current having a predetermined number, $n_{ph}$, of phases. The number of the phases can be 2, 3 or more. The stator 2 of these electric motors has a predetermined number, $n_{stat}$, of coil tuples. Each of the coil tuples comprises $n_{ph}$ coils for the $n_{ph}$ phases of the rotary current, so that a coil of a coil tuple is assigned to each phase of the rotary current. The stator rotation field is invariant with respect to rotations about $360°/n_{stat}$.

The electric motor shown in FIGS. 1 and 2 are designed for operation with three-phase alternating current, the phases of which are designated as U, V and W. The stators 2 comprise six coils, all of which have the same winding sense. The six coils therefore form $n_{stat}=2$ coil triples, i.e., the coil tuples are coil triples. Each of the two coil triples comprises three coils, namely a coil for the phase U, a coil for the phase V and a coil for the phase W. The stator rotational field thus corresponds to a rotating magnetic quadrupole.

The six coils can alternatively have a different winding sense, namely U, V, W, −U, −V and −W, the minus sign denoting the inverted winding sense. In this case, the six coils form a single coil tuple, i.e., it is $n_{stat}=1$. In this case, the stator rotational field corresponds to a rotating magnetic dipole.

The electric motors can also have a different number of coils and other wirings.

The rotor 1 of the synchronous motor shown in FIG. 1 is a permanent magnet having a predetermined number $n_{rot1}$, of pole pairs, in the example shown $n_{rot1}=4$. In addition, a permanent magnet 4, in particular a dipole magnet, can be attached to the rotor shaft. A dipole magnet has $n_{rot1}=1$. A multipole magnet has $n_{rot1}>1$.

In an asynchronous motor, at least one permanent magnet 4 is attached to the shaft. The permanent magnet 4 can be a dipole magnet (as shown in FIG. 2) or a multipole magnet. In particular, two permanent magnets 4 can be provided, namely one with $n_{rot1}=1$ and one with $n_{rot2}>1$.

This results in the following: The rotor 1 and/or one or two permanent magnets rotating with the rotor 1 produce a magnetic field which has a dipole character, a multipole character or a dipole character and a multipole character. The magnetic field rotating with the rotor 1 is accordingly characterized by one or two values $n_{rot1}$, $n_{rot2}$, wherein $n_{rot1}$ (or $n_{rot2}$)=1 for the dipole field and $n_{rot2}$ (or $n_{rot1}$)>1 for the multipole field. The currents flowing through the stator coils of the stator 2 produce a stator rotational field, which also rotates about the axis 3. In principle, the magnetic field generated by the rotor 1 is invariant against rotations by $360°/n_{rot1}$ (or $360°/n_{rot2}$, respectively) and the magnetic field generated by the stator 2 is invariant against rotations about $360°/n_{stat}$.

A magnetic field rotating with the rotor 1 with $n_{rot1}=1$ makes it possible to determine the absolute position of the rotor 1, i.e., its position within the full angular range of 0-360°. A magnetic field rotating with the rotor 1 with $n_{rot}>1$ makes it possible to determine an incremental position of the rotor 1, i.e., the corresponding position value in the interval 0-360° is repeated $n_{rot}$ times with a complete rotor rotation, so that position changes of the rotor 1 are detectable, but not its absolute position. If the magnetic field rotating with the rotor 1 has both dipole characteristics and multipole characteristics, the absolute position as well as the incremental position of the rotor 1 can be determined with the sensor device according to the invention.

The sensors are intended to detect—as useful field—the magnetic field generated by the rotor 1 and/or by the permanent magnet rotating with the rotor 1, but not the magnetic interference fields generated by the stator 2. The sensors are therefore preferably arranged on the front face of the electric motor of FIG. 1 on the side facing the axis 3, i.e., on the inside of the rotor 1, and in the electric motor of FIG. 2 preferably on the side of the permanent magnet 4 facing away from the stator 2 in order to minimize the signal component of the magnetic interference fields generated by the stator 2. The sensors are advantageously arranged on a common substrate, for example a printed circuit board.

If the sensor arrangement is configured for controlling an electric motor which also uses the stator rotational field for control purposes, the sensors, or at least some of them, are also intended to detect the stator rotational field. In this case, the sensors are advantageously arranged in such a way that most of them detect both the magnetic field rotating with the rotor 1 as well as the magnetic field rotating with the stator 2.

Sensor Device

The sensor device additionally comprises an electronic circuit 5 (FIG. 3) with all necessary electronic components, in particular A/D converters and computing unit, which are required for operating the sensors and for evaluating the signals $a_1$ to $a_r$ supplied by the r sensors. The determination of a position $\phi_1$ requires, and is subsequently explained, the multiplication of a matrix $M_{rot1}$ with a measurement vector derived from the sensor signals $a_1$ to $a_r$. The matrix $M_{rot1}$ is stored in a memory of the electronic circuit 5. If two positions, for example the absolute position and an incremental position, are to be determined, two different matrices $M_{rot1}$ and $M_{rot2}$ are accordingly stored in the memory.

The sensor device is configured, to detect and digitalize the sensor signals $a_1$ to $a_r$ and to form a signal vector $\vec{a} = (a_1, \ldots, a_r)$, to form a measurement vector $\vec{q}$ according to a predetermined linear function g to $\vec{q} = g(\vec{a})$, wherein the measurement vector $\vec{q}$ comprises a number, n, of components, with $2 \leq n \leq r$, to calculate a vector $\vec{p} = M_{rot1} \cdot \vec{q}$, wherein $\vec{p}$ is a 2-component vector with the components $p_1$ and $p_2$ and $M_{rot1}$ is a 2×n matrix, and to determine a first position $\phi_1$ of the rotor to $\phi_1 = $ a tan $2(p_2, p_1)$.

The sensor device may further be configured, to calculate a vector $\vec{x} = M_{rot2} \cdot \vec{q}$, wherein $\vec{x}$ is a 2-component vector with the components $x_1$ and $x_2$ and $M_{rot2}$ is a 2×n matrix, and to determine a second position $\phi_2$ of the rotor to $\phi 2 = $ a tan $2(x_2, x_1)$.

The function $g(\vec{a})$ is in particular one of the following functions:

$$g(\vec{a}) = \vec{a}, \quad 1)$$

$$g(\vec{a}) = \vec{a} - \vec{a}_0, \quad 2)$$

$$g(\vec{a}) = P \cdot \vec{a}, \text{ or} \quad 3)$$

$$g(\vec{a}) = P \cdot (\vec{a} - \vec{a}_0), \quad 4)$$

wherein $\vec{a}_0$ designates an offset vector and P a projection matrix. The use of an offset vector allows correction of possible offsets of the sensors. The use of the projection matrix makes it possible to project signal components caused by interference fields out of the measured values. The function a tan $2(p_2, p_1)$ corresponds for example to the arctangent function known from the programming language C.

The matrices $M_{rot1}$ and $M_{rot2}$ depend on the multipole character of the magnetic field rotating with the rotor 1, i.e., from the parameter $nrot_1$ or $n_{rot2}$, respectively. With a matrix $M_{rot1}$, which has been calculated with $n_{rot1}=1$, the first position $\phi_1$ is the absolute position in the angle range from 0-360°. With a matrix $M_{rot2}$, which has been calculated with $n_{rot2}>1$, the second position $\phi_2$ this is in fact also a position in the angle range from 0-3600, but this does not correspond to the actual absolute position of the rotor 1, since the delivered position $\phi_2$ passes $n_{rot2}$ times through the angular range of 0-360° during a complete rotor rotation. The second position $\phi_2$ is therefore an incremental position.

The matrices $M_{rot1}$ and $M_{rot2}$ and given the case the projection matrix P can be determined for example with the COBROS method, which is described in the above-referenced and in this application incorporated related U.S. patent application Ser. No. 15/694,798. Where necessary, further explanations are given below.

With $n_{rot1}=1$ and $n_{rot2}>1$ the first position $\phi_1$ is the absolute position and the second position $\phi_2$ is the incremental position, the accuracy of the incremental position being generally higher than the accuracy of the absolute position. The absolute position $\phi_1$ is therefore advantageously recalculated from the more accurate incremental position $\phi_2$ and the less exact absolute position $\phi_1$. The calculation depends on the angle range in which the incremental position $\phi_2$ is supplied. The a tan 2 ( ) function always provides angles in the range 0-360°. The recalculation then takes place, for example, to $\phi_1 = \phi_2/n_{rot2} + \text{INT}(\phi_1 * n_{rot2}/360°) * 360°/n_{rot2}$, where the function INT (x) returns the integer portion of x.

The influence of the stator rotational field on the measured position disappears if the rotational symmetry of the stator rotational field is different from the rotational symmetry of the rotor field. This is the case, if $n_{stat} < > n_{rot1}$ and, given the case, additionally also $n_{stat} < > n_{rot2}$. In order to determine the absolute position in this case, either it has to be $n_{stat} > 1$ or the sensors must be arranged in such a way that they do not detect the stator rotational field or are shielded as far as possible from the stator rotational field.

The influence of the stator rotational field on the measured position can, on the other hand, be eliminated by means of a projection matrix P and a sufficient number r of sensors.

These principles are explained in more detail below with reference to some exemplary embodiments.

Example 1

The number r of the sensors is r=2. The number $n_{stat}$ of the coil tuples of the stator 2 is selected differently from the number $n_{rot1}$ of the pole pairs of the rotor 1, so that the rotating field generated by the stator 2 does not influence the measuring result. With r=2 sensors, an offset correction and the suppression of the rotating field of the stator 2 is possible, but no suppression of external magnetic disturbing fields. The function $g(\vec{a})$ is therefore either $g(\vec{a}) = \vec{a}$ or $g(\vec{a}) = \vec{a} - \vec{a}_0$.

The determination of the matrix $M_{rot1}$ according to the method described in the above-referenced related U.S. patent application Ser. No. 15/694,798 requires the calculation of an auxiliary matrix W having the matrix elements $W_{ij}$ $$W_{ij} = \begin{cases} \sin\left(fe \cdot \frac{(\phi_{max} - \phi_{min})(j-1)}{m}\right), i = 1 \\ \cos\left(fe \cdot \frac{(\phi_{max} - \phi_{min})(j-1)}{m}\right), i = 2 \end{cases}, \text{ for } j = 1 \text{ to } m,$$

wherein the number of pole pairs of the rotor 1 is to be used for the parameter e, i.e., it is $e=n_{rot1}$. Since the angular range is 360°, this simplifies to $$W_{ij} = \begin{cases} \sin\left(fn_{rot1} \cdot \frac{2\pi(j-1)}{m}\right), i = 1 \\ \cos\left(fn_{rot1} \cdot \frac{2\pi(j-1)}{m}\right), i = 2 \end{cases}, \text{ for } j = 1 \text{ to } m,$$

If the magnetic field has both dipole and multipole characteristics and if $n_{rot1} < > n_{stat}$ as well as $n_{rot2} < > n_{stat}$, then both the absolute position and an incremental position can be determined. The determination of the matrix $M_{rot2}$ takes place in the same way, with $n_{rot1}$ replaced by $n_{rot2}$ in the equation above. The position $\phi_1$ or $\phi_2$ of the rotor 1 calculated with the sensor device according to the invention achieves a higher measuring accuracy or smaller angular errors with only two sensors compared to the position calculated with the widespread sin-cos evaluation method.

Example 2

An additional sensor allows the suppression of a magnetic field having an arbitrary spatial structure.

Example 3

A number m of additional sensors enable for example the suppression of m mutually independent external magnetic fields, each of which has an arbitrary spatial structure.

Example 4

Two additional sensors allow suppression of the stator rotational field during operation with a 3-phase rotating current as long as the relative phase position of the three currents is 120°. This case is interesting when the number $n_{stat}$ of the coil tuples of the stator 2 equals the number $n_{rot}$ of the pole pairs of the rotor 1.

Example 5

Three additional sensors allow for example the suppression of the stator rotational field during operation with a 3-phase rotating current, if the three phases are arbitrarily controlled, i.e., if they are not or only partially correlated.

The suppression of the stator rotational field is performed automatically, if the number $n_{stat}$ of the coil tuples of the stator 2 and the number $n_{rot1}$ and given the case $n_{rot2}$ of the pole pairs of the motor 1 are different. However, the suppression of the stator rotational field can also be effected by means of a projection matrix P, which can be determined, for example, by means of the method described in the above-referenced related U.S. patent application Ser. No. 15/694,798. The application of the external field in the determination of the projection matrix P takes place in the case of the examples 4 and 5, in that in step 1.1 or 1.3.1 of the method described in the related U.S. patent application:

a) first the stator coils associated with the first phase of the three-phase rotating current are supplied with a predetermined current, b) and then the stator coils associated with the second phase of the three-phase rotating current are supplied with a predetermined current, c) and then given the case the stator coils associated with the third phase of the three-phase rotating current are supplied with a predetermined current.

When the amplitude of the currents flowing through the stator coils exceeds a certain limit, non-linear magnetic saturation effects occur in the magnetic material of the stator 2 and/or the rotor 1, which lead to harmonic waves in the sensor signals. The disturbing influence of the harmonic waves on the rotor position determination can be eliminated by using more than r=4 sensors.

Control Device for an Electric Motor

The sensor device may be supplemented with further electronic components to form a control device for an electric motor. Depending on the application, the control device can use an absolute position or an incremental position of the rotor for controlling the electric motor. In the following, the position used is designated by $\phi$. The position $\phi$ is either the position $\phi_1$ or the position $\phi_2$.

The control device can, for example, be configured to use the desired position $\phi_{soll}$ and the measured actual position $\phi$ in order to control the currents flowing through the stator coils of the stator 2. However, the control device can also be configured to detect, in addition to the position $\phi$ of the rotor 1 also the position $\psi$ (=rotational position or rotation angle or rotary phase) of the magnetic field generated by the currents flowing through the stator coils, which in turn allows control of the stator currents corresponding to the actual positions $\phi$ and $\psi$. This magnetic field will hereinafter be referred to as stator rotational field. This is possible with a number of at least four sensors, of which at least some are arranged in such a way that they also detect the stator rotational field. The control devices according to the invention are suitable for any electric motors, including stepping motors or speed-controlled electric motors. The positions $\phi$ and $\psi$ are usually dynamic, i.e., time-dependent signals. Subsequently, some examples are described.

Example 6

Figure 3:
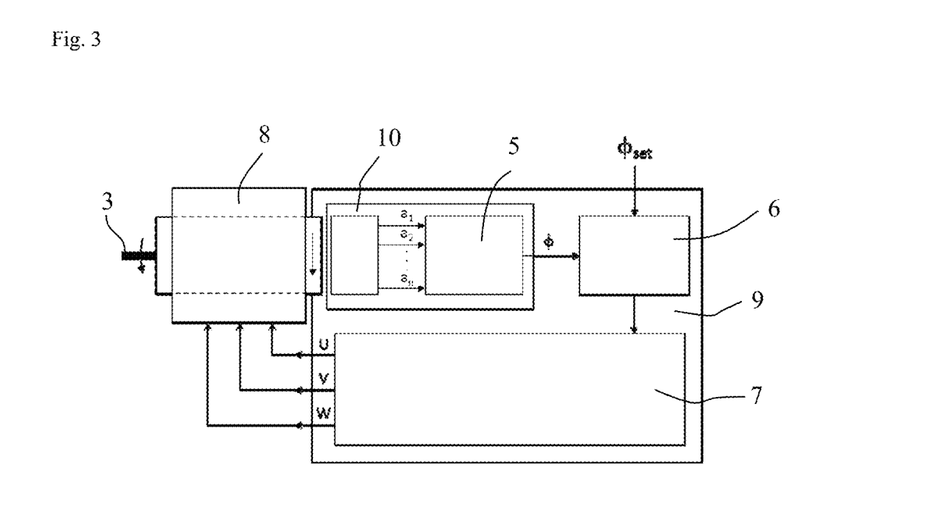

FIG. 3 schematically shows an electric motor 8 and a control device 9. The control device 9 comprises a sensor device 10 of the type described above, and further a motor controller 6 and a drive unit 7. The position $\phi$ of the rotor 1 of the electric motor 8 determined by the sensor device 10 is fed to the motor controller 6 which therefrom generates control signals for the drive unit 7. The drive unit 7 generates the currents for the stator coils of the electric motor 8. The electric motor 8 is operated, for example as shown, with a 3-phase rotating current. The three currents are accordingly designated with U, V and W. The currents U, V and W depend on time.

Example 7

Figure 4:
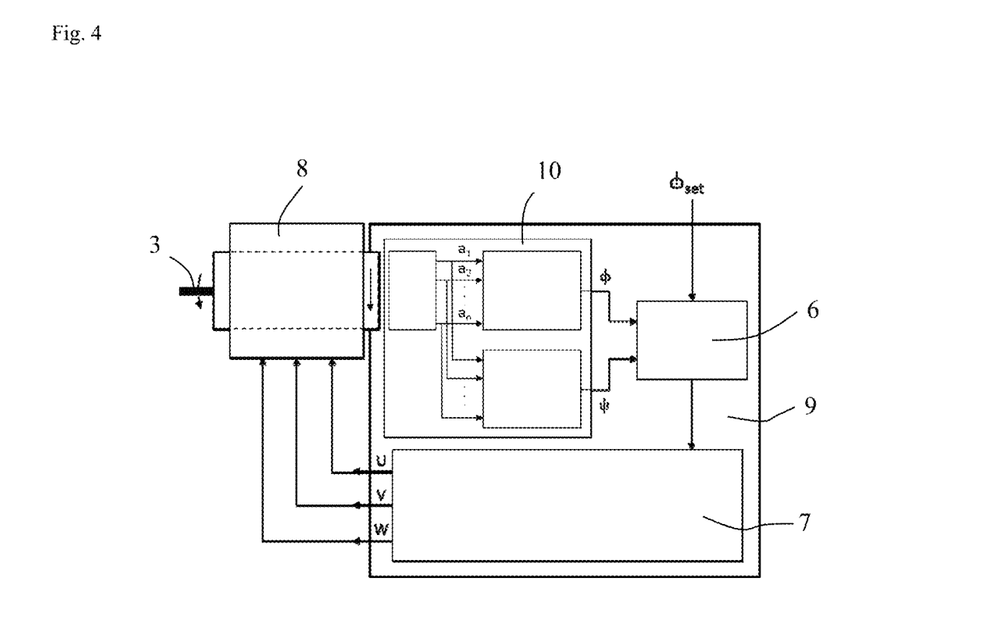

FIG. 4 schematically shows the electric motor 8 and a control device 9. The control device 9 comprises again a sensor device 10 of the type described above, which is additionally configured to detect the position $\psi$ of the stator rotational field, with the steps:

to calculate a vector $\vec{y} = M_{stat} \cdot \vec{q}$, wherein $\vec{y}$ is a 2-component vector with the components $y_1$ and $y_2$ and $M_{stat}$ is a 2×n matrix, and to determine the position $\psi$ of the stator rotational field to $\psi$=a tan 2($y_2$, $y_1$).

The matrix $M_{stat}$ can for example also be determined according to the COBROS method referred to above which is described in the above-referenced related U.S. patent application Ser. No. 15/694,798, wherein the number $n_{stat}$ of the coil tuples of the stator 2 is to be used for the parameter e in the calculation of the auxiliary matrix W. The elements of the auxiliary matrix W are thus given for the determination of the matrix $M_{stat}$ by $$W_{ij} = \begin{cases} \sin\left(fn_{stat} \cdot \frac{2\pi(j-1)}{m}\right), i = 1 \\ \cos\left(fn_{stat} \cdot \frac{2\pi(j-1)}{m}\right), i = 2 \end{cases}, \text{ for } j = 1 \text{ to } m,$$

At least one position $\phi$ of the rotor 1, i.e., $\phi_1$, $\phi_2$, or both positions $\phi_1$ and $\phi_2$, and the determined position t of the stator rotational field are supplied to the motor controller 6, which generates control signals for the drive unit 7 therefrom.

The sensor device according to the invention for determining the position of the rotor and of the rotary phase of the stator offers several advantages, including:

a high integration density, i.e., the construction of a space-saving sensor device; which also allows the construction of extremely compact flat motors, all necessary measuring signals are obtained from the same sensors, all measurement signals are used for the solution of all tasks (elimination of external fields, determination of the rotor position angle, determination of the rotary current angle), all processing steps are executed in the same architecture (FPGA, microprocessor or DSP), thus exhibiting the same delays or possibly distortions. This ensures that the measured value quality of the rotary current phase position and the rotor position is independent of the operating point at which the motor is operated. In addition, all measurement signals refer to exactly the same measuring time. This allows very robust motor systems to be implemented, for example, in order to operate the electric motor at the operating point with maximum torque.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims and their equivalents.

The invention claimed is:

1. A sensor device configured to determine a first position $\phi_1$ of a rotor of an electrical machine, wherein the electrical machine comprises the rotor and a stator with stator coils, wherein the rotor is a permanent magnet with a predetermined number $n_{rot1}>1$ of pole pairs or a passive rotor, wherein the magnetic field generated by the rotor and/or by the permanent magnet rotating with the rotor has a multiple character and the first position $\phi_1$ is therefore an incremental position, wherein the sensor device has a predetermined number r of magnetic sensors, which detect the magnetic field generated by the rotor and/or by the permanent magnet rotating with the rotor, and an electronic circuit, wherein the electronic circuit is configured to determine the first position $\phi_1$ of the rotor with only the four following steps of:

first, detecting and digitizing the sensor signals $a_1$ to $a_r$ and forming a signal vector $\vec{a}=(a_1, \ldots, a_r)$, second, after the first step, forming a measurement vector $\vec{q}$ according to a predetermined linear function g such that $\vec{q}=g(\vec{a})$, wherein the measurement vector $\vec{q}$ comprises a number, n, of components, with $2 \leq n \leq r$, third, after the second step, calculating a vector $\vec{p}=M_{rot1} \cdot \vec{q}$, wherein $\vec{p}$ is a 2-component vector with the components $p_1$ and $p_2$ and $M_{rot1}$ is a 2×n matrix, and fourth, after the third step, determining the first position $\phi_1$ of the rotor such that $\phi_1=a \tan 2(p_2, p_1)$.

2. The sensor device according to claim 1, further configured to calculate a vector $\vec{x}=M_{rot2} \cdot \vec{q}$, wherein $\vec{x}$ is a 2-component vector with the components $x_1$ and $x_2$ and $M_{rot2}$ is a 2×n matrix, and to determine a second position $\phi_2$ of the rotor to $\phi_2=a \tan 2(x_2, x_1)$, wherein the second position $\phi_2$ is an absolute position.

3. The sensor device according to claim 2, wherein the sensor device is further configured to recalculate the second position $\phi_2$ from the positions $\phi_1$ and $\phi_2$ to obtain the absolute position $\phi_2$ with a higher accuracy.

4. The sensor device according to claim 2, wherein the function $g(\vec{a})$ is one of the following functions:

$$g(\vec{a})=\vec{a}, \qquad 1)$$

$$g(\vec{a})=\vec{a}-\vec{a}_0, \qquad 2)$$

$$g(\vec{a})=P \cdot \vec{a}, \text{ or} \qquad 3)$$

$$g(\vec{a})=P \cdot (\vec{a}-\vec{a}_0), \qquad 4)$$

wherein $\vec{a}_0$ designates an offset vector and P a projection matrix.

5. The sensor device according to claim 4, further comprising:

a control device for an electric motor which comprises a rotor and a stator, wherein the control device comprises, a motor controller, and a drive unit, wherein second position $\phi_2$ of the rotor of the electric motor determined by the sensor device is fed to the motor controller, the motor controller is configured to generate control signals dependent on the second position $\phi_2$ for the drive unit, and the drive unit is configured to generate currents for the stator coils of the electric motor.

6. The sensor device according to claim 2, further configured to determine a position ψ of the stator rotational field of the electrical machine, for which it is configured to calculate a vector $\vec{y}=M_{stat} \cdot \vec{q}$, wherein $\vec{y}$ is a 2-component vector with the components $y_1$ and $y_2$ and $M_{stat}$ is a 2×n matrix, and to determine the position ψ of the stator rotational field to $\psi=a \tan 2(y_2, y_1)$.

7. The sensor device according to claim 6, further comprising:

a control device for an electric motor which comprises a rotor and a stator, wherein the control device comprises, a motor controller, and a drive unit, wherein the second position $\phi_2$ of the rotor and the position ψ of the stator rotational field of the electric motor determined by the sensor device are fed to the motor controller, the motor controller is configured to generate control signals dependent on the positions $\phi_2$ and ψ for the drive unit, and the drive unit is configured to generate currents for the stator coils of the electric motor.

8. The sensor device according to claim 2, further comprising:

a control device for an electric motor which comprises a rotor and a stator, wherein the control device comprises, a motor controller, and a drive unit, wherein the second position $\phi_2$ of the rotor of the electric motor determined by the sensor device is fed to the motor controller, the motor controller is configured to generate control signals dependent on the second position $\phi_2$ for the drive unit, and the drive unit is configured to generate currents for the stator coils of the electric motor.

9. The sensor device according to claim 1, wherein the function $g(\vec{a})$ is one of the following functions:

$$g(\vec{a})=\vec{a}, \quad \quad 1)$$

$$g(\vec{a})=\vec{a}-\vec{a}_0, \quad \quad 2)$$

$$g(\vec{a})=P\cdot\vec{a}, \text{ or} \quad \quad 3)$$

$$g(\vec{a})=P\cdot(\vec{a}-\vec{a}_0), \quad \quad 4)$$

wherein $\vec{a}_0$ designates an offset vector and P a projection matrix.

10. The sensor device according to claim 9, further comprising:
a control device for an electric motor which comprises a rotor and a stator, wherein the control device comprises,
a motor controller, and
a drive unit, wherein
the first position $\phi_1$ of the rotor of the electric motor determined by the sensor device is fed to the motor controller,
the motor controller is configured to generate control signals dependent on the first position $\phi_1$ for the drive unit, and
the drive unit is configured to generate currents for the stator coils of the electric motor.

11. The sensor device according to claim 1, wherein the electrical machine is a synchronous motor, asynchronous motor, alternating current motor, stepping motor or electric generator.

12. The sensor device according to claim 1, wherein the electrical machine is a flat motor.

13. The sensor device according to claim 1, wherein the magnetic sensors are Hall sensors or magnetoresistive sensors and arranged on a common substrate.

14. The sensor device according to claim 1, further configured to determine a position $\psi$ of the stator rotational field of the electrical machine, for which it is configured
to calculate a vector $\vec{y}=M_{stat}\cdot\vec{q}$, wherein $\vec{y}$ is a 2-component vector with the components $y_1$ and $y_2$ and $M_{stat}$ is a 2×n matrix, and
to determine the position $\psi$ of the stator rotational field to $\psi=a\tan 2(y_2, y_1)$.

15. The sensor device according to claim 14, further comprising:
a control device for an electric motor which comprises a rotor and a stator, wherein the control device comprises,
a motor controller, and
a drive unit, wherein
the first position $\phi_1$ of the rotor and the position $\psi$ of the stator rotational field of the electric motor determined by the sensor device are fed to the motor controller,
the motor controller is configured to generate control signals dependent on the positions 1$i$ and W for the drive unit, and
the drive unit is configured to generate currents for the stator coils of the electric motor.

16. The sensor device according to claim 1, further comprising:
a control device for an electric motor which comprises a rotor and a stator, wherein the control device comprises,
a motor controller, and
a drive unit, wherein
the first position $\phi_1$ of the rotor of the electric motor determined by the sensor device is fed to the motor controller,
the motor controller is configured to generate control signals dependent on the first position $\phi_1$ for the drive unit, and
the drive unit is configured to generate currents for the stator coils of the electric motor.

* * * * *